United States Patent [19]

Shinagawa et al.

[11] Patent Number: 5,500,095
[45] Date of Patent: Mar. 19, 1996

[54] HIGH EFFICIENCY CHEMICAL PROCESSING

[75] Inventors: Robert T. Shinagawa, Encinitas; Susan M. Jordan, Danville; Christopher S. Blatt, La Costa, all of Calif.

[73] Assignee: Athens Corporation, Oceanside, Calif.

[21] Appl. No.: 224,956

[22] Filed: Apr. 8, 1994

[51] Int. Cl.$^6$ .............................. B01D 3/42; C01B 17/90
[52] U.S. Cl. .................... 203/2; 203/3; 203/12; 203/49; 203/98; 203/DIG. 11; 423/531; 159/DIG. 19
[58] Field of Search .................. 203/12, 49, 3, 203/2, 1, DIG. 11, 98, 49, DIG. 18, DIG. 16; 159/DIG. 19; 423/531; 210/767; 202/160, 161, 202, 162

[56] References Cited

U.S. PATENT DOCUMENTS

| | | | |
|---|---|---|---|
| Re. 30,870 | 2/1982 | Inoue . | |
| 2,456,398 | 12/1948 | Gerhold . | |
| 2,588,303 | 4/1952 | Stanley | 202/161 |
| 2,711,992 | 6/1955 | Kerner | 202/162 |
| 3,012,949 | 12/1961 | Mooney | 202/161 |
| 3,442,767 | 5/1969 | Hall . | |
| 3,446,710 | 5/1969 | Sissons, Jr. et al. | 202/162 |
| 3,548,851 | 12/1970 | Sampson . | |
| 3,721,255 | 3/1973 | Suzuki et al. . | |
| 3,732,257 | 5/1973 | Knobloch et al. | 203/15 |
| 4,138,309 | 2/1979 | Kuhnlain et al. | 203/12 |
| 4,194,952 | 3/1980 | Bodenbenner et al. | 203/12 |
| 4,828,660 | 5/1989 | Clark et al. | 204/82 |
| 4,855,023 | 8/1989 | Clark et al. | 204/130 |
| 4,980,032 | 12/1990 | Dobson et al. | 203/12 |
| 5,061,348 | 10/1991 | McCormick et al. | 202/154 |
| 5,225,048 | 7/1993 | Yaun | 203/1 |
| 5,236,555 | 8/1993 | Yuan | 203/3 |

*Primary Examiner*—Virginia Manoharan
*Attorney, Agent, or Firm*—Knobbe, Martens, Olson & Bear

[57] ABSTRACT

A high efficiency batch sulfuric acid reprocessor system that is capable of producing high purity acid through distillation. Methods of use are also provided. The distillation is monitored and controlled in accordance with temperatures of the system, in particular, the temperature of the column and the temperature of the vapor in a condensing chamber. A stream splitter enables the invention to selectively collect high purity product as well as remove waste or recycle condensate as reflux.

6 Claims, 9 Drawing Sheets

HIGH EFFICIENCY CHEMICAL PROCESSING

BACKGROUND OF THE INVENTION

1. Field of the Invention

The present invention relates to an automated high efficiency chemical processor that permits the purification or reprocessing of chemicals contaminated with water and other materials.

2. Background of the Invention

Numerous technologies use or supply chemicals in their manufacturing process. The price for chemicals increases dramatically as the purity requirement increases. Transportation of chemicals from remote sites to the manufacturing facility can reduce chemical purity through the generation of undesired micron and sub-micron sized particles. Transportation of chemicals can likewise expose the general population to hazardous substances. The environmental impact of disposing of large quantities of spent or contaminated chemicals is becoming socially unacceptable and adding excessive cost to the manufacturing cycle. Manufacturers are looking for ways to purify and/or re-use ultra-pure chemicals directly at their manufacturing locations.

This is particularly true in the manufacturing processes of electronic and semiconductor devices. There, parts, such as integrated circuit wafers and printed circuit boards, must be washed in concentrated acid in either an etching step or a cleaning step. One specific example is the pre-diffusion cleaning and photoresist stripping that is accomplished in the manufacture of integrated circuit wafers through the use of concentrated sulfuric acid and accompanying oxidants, for instance, an aqueous solution of hydrogen peroxide.

Inevitably, therefore, the acid baths used for the above purposes become contaminated, such as from the materials cleaned or etched, mixed; or become mixed with the water carried by the oxidant, and/or absorb water from various sources. In addition to water, the acids typically contain particulate impurities, cations, anions, and organic compounds. Although some contaminants, such as certain particulates, may be removed by filtering or other simple purification techniques, it has been difficult to completely regenerate the concentrated acid. In particular, because acids are in general hydrophilic, it has heretofore been difficult to remove sufficient water.

Consequently, there has been a tendency for industries to generate large quantities of acid wastes. This is neither economical nor environmentally sound. Thus, a need exists for small scale, on-site equipment for reprocessing of such chemicals. Also, some manufacturers have a need to initially purify lower grade chemicals to ultra-pure grade. Indeed, the art has recognized this need and there has been increased attention to the development of methods and apparatus to recycle and purify chemical wastes, such as acids. E.g., U.S. Pat. Nos. 4,828,660 and 4,855,023.

In these aforementioned patents, the oxidizing agents and other contaminants were first stripped from the used contaminated acids, with the combination of heating the mixture and purging the mixture with air or an inert gas stream to remove the water. However, this process is a continuous process, and no endpoint detection or reflux control was provided. Nevertheless, a interesting finding was that the resulting recycled concentrated acids may, in some cases, be more pure than the commercially purchased starting acid.

In U.S. Pat. Nos. 5,225,048 and 5,236,555, a method and an apparatus are disclosed, respectively, to concentrate liquids through a distillation process utilizing constant, predetermined parameters. Such parameters include, water content and flow rate of the feed, the distillate flow rate, and the heating power for the distillation column. These copending applications are directed primarily at situations in which the chemical sought to be purified is more volatile than water. More specifically, they are directed toward reprocessing single or multiple-phase organic solvents that are more volatile than water.

In co-pending U.S. patent application Ser. No. 08/002,995, a method and an apparatus are disclosed for the continuous or semi-continuous purification of chemical compounds that are less volatile than their contaminants. The purified product is removed from the bottom of the column, i.e., from the distillation pot after driving off the less volatile contaminants. The method uses predetermined operating conditions.

In the case of concentrated acids, and also many other chemical compounds, the chemical compound sought to be purified is less volatile than water. In such situations, many problems not encountered with more volatile chemicals will become evident to one skilled in the art.

Sulfuric acid reprocessing is typically accomplished in the industry through use of continuous or continuous batch processing systems.

In such systems, at least two (and often three) columns are needed to carry out the reprocessing process. In such processes, larger quantities of equipment and complex operating conditions are necessary. Those factors combine to increase the cost of the systems. In addition, the systems are relatively complicated to operate, require a significant amount of plant space, numerous external connections, and produce purified product in such quantities that only large scale users realize the full benefit of the equipment.

Accordingly, there is a need in the art for a low cost, compact, fully automated purification and/or reprocessing system that is able to function with high efficiency and deliver ultra-pure chemical without the need for engineers or technicians to continually operate and monitor the system.

SUMMARY OF THE INVENTION

The foregoing problems are solved by the present invention through providing a fully automated, computer controlled purification and/or reprocessing system and method, that operates with a single column for the multiple steps involved in providing ultra-pure chemical.

In accordance with one aspect of the present invention, there is provided a system for the reprocessing of a liquid product contaminated with a liquid contaminant comprising a distillation apparatus, wherein the distillation apparatus further comprises a flow controller for directing contaminated product into a distillation column, a distillation column having a top and a bottom so connected as to receive the contaminated product from the flow controller, a heater for applying heat to the column, a condenser connected to the top of the column, adapted to condense vaporized liquid exiting the top of the column, a temperature sensor and a pressure sensor associated with the column in such a way as to measure temperature and pressure in the column, respectively, a reflux splitter connected between the condenser and the column so as to direct a first selectable portion of condensate back into the column and a second selectable portion of the condensate away from the column, a process controller operably connected to the reflux splitter, the temperature sensor, and the pressure sensor, the process controller programmed to increase the proportion of condensate returned to reflux in response to the temperature and pressure sensors until a predetermined threshold value is reached so that the condensate comprises primarily the liquid contaminant, which is indicative of a predetermined concentration of liquid product in the column, and then to reduce the proportion of condensate returned to reflux so that the condensate comprises the product in a predetermined desired concentration. In one embodiment of the invention, the product is a mineral acid and the contaminant is water. In a preferred embodiment, the acid is sulfuric acid.

In one advantageous embodiment, the reflux splitter includes a gas nozzle adapted to direct condensate away from the column or to reflux by applying or not applying a gas to a moving column of condensate to change the direction of the moving column.

Additionally, the invention may include a product collection tank connected to the condenser to receive condensed product therefrom, with an optional recycle line connected to the product collection tank, a pump connected to the recycle line for directing product from the product collection tank through the recycle line and back into the product collection tank, and a filter interposed in the recycle line for removing particulates from product circulating through the recycle line.

In one embodiment of the splitter, there is provided a housing having an outer wall and a closed end and an open end with a wall interposed therebetween the open end and the closed end, the wall having a flow channel extending and providing fluid communication therethrough, at least two collector lines providing fluid communication through the closed end of the housing, and a gas inlet extending through the outer wall of the housing, the gas inlet having a nozzle end in the housing in proximity to the flow channel, wherein a gas passing through the nozzle is adapted to divert a stream of a condensate communicated through the flow channel to one of the collector lines into another of the collector lines.

The invention also includes a method for batchwise distillation of a liquid product contaminated with a liquid contaminant, comprising the steps of directing the contaminated product into a distillation apparatus, heating the contaminated product in the distillation apparatus, monitoring the temperature and pressure in the column, first condensing liquid contaminant from vapor exiting the top of the column, and directing increasing amounts of condensate into the column as reflux as the temperature and/or pressure in the column increases, thereby maintaining the composition of the condensate as primarily the liquid contaminant, and then decreasing the amount of condensate returned as reflux when the temperature and/or pressure in the column indicates that the composition of the liquid in the column has reached a predetermined value, whereby product is allowed to condense in the condenser, and collecting condensed product. The method may also advantageously include the step of directing condensed contaminant to waste. Preferably, the product is a mineral acid, such as sulfuric acid or hydrochloric acid, and the contaminant is water. The method may also include the step of circulating the collected product through a filter to remove particulates. Preferably, the step of directing condensate into the column or away from the column is accomplished by applying and releasing a tangential stream of gas to a column of condensate to change the direction of the column.

The aforementioned stream splitter itself constitutes yet another aspect of the present invention.

BRIEF DESCRIPTION OF THE DRAWING FIGURES

DETAILED DESCRIPTION OF THE PREFERRED EMBODIMENTS

Figure 1:
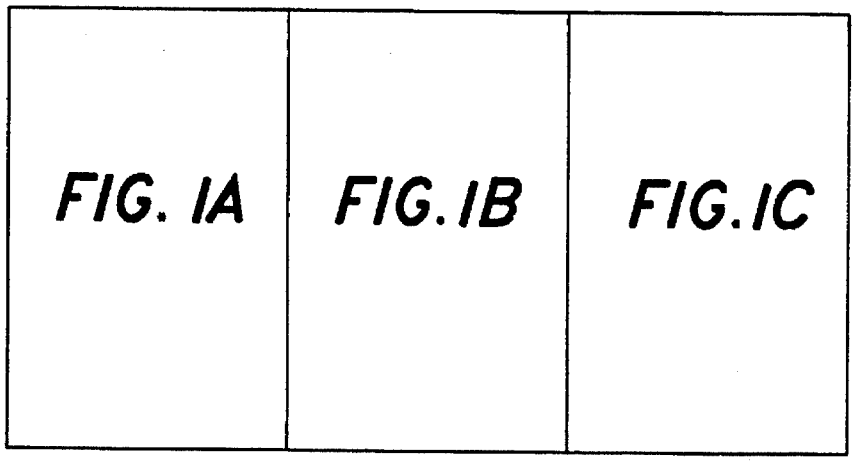
FIG. 1 is a schematic diagram of the process apparatus of a preferred embodiment of the present invention.

In accordance with the present invention, we have surprisingly discovered that the goal of a chemical processor having high efficiency and being controlled in a fully automatic manner can be achieved through the use of a single column fractionation system. The preferred embodiment of the system is described for a purification and/or reprocessing system for the inorganic chemical sulfuric acid contaminated with water ad other contaminants. It is obvious to one skilled in the art of column fractionation that hydrochloric acid, ammonia hydroxide, isopropyl alcohol, and many other acids, bases, solvents, and other chemicals with their contaminants could likewise be purified and/or reprocessed with minor engineering adjustments or changes to the temperatures, pressure, column diameter, times, flow rates, reflux rates, and packing height, all within the skill of the art. This discovery is made possible, in large part, through careful control of process conditions, including the distillation temperature, reflux rate, and contaminant removal rate. In most embodiments, a major contaminant is water.

In general, in accordance with the invention, the contaminated acid, of a given contaminant to acid ratio, is fed into a fractionation column with a distillation container attached or formed thereon. The contaminant varies depending on the process from whence the acid came. For example, in certain applications, such as semiconductor and electronic fabrication application, the acid may be contaminated with water, light organic solvents, heavy or ionic metals, other anions or cations, and other contaminants. The particular makeup of the contaminant/acid composition will determine many of the parameters to be used in reprocessing. For example, where acid is contaminated with water, water stripping will need to be performed. Where there is minimal to no water contamination, water stripping will not be necessary; however, some other light boiling contaminant may need to be removed, such as isopropyl alcohol.

The general process in accordance with the invention comprises the following steps. First, the distillation pot or receptacle is charged with the impure or contaminated chemical. Second, the pot or receptacle is heated to begin the distillation process. Third, the volatile contaminants are vaporized. For example, if the mixture in the column is sulfuric acid and water, the water comes off as a volatile component. Fourth, the volatile contaminants are condensed. Fifth, some of the condensed volatiles are routed from the column, while a portion is returned as reflux to the column. Sixth, by knowing the basic chemistry of the liquid being distilled, for example, sulfuric acid and water with a few parts per million of other contaminants, and by monitoring the distillation conditions such as the temperature and pressure of the boiling pot and the temperature of the vapor at the top of the column, the composition of the distillate can be determined. The monitoring of the temperature, and/or pressure is accomplished through the use of industry accepted temperature and/or pressure measurement electrical or electronic devices that are connected to provide data to the control computer. Seventh, once the desired amount of the water or other volatile has been removed, as determined by the temperature and pressure of the boiling pot and the temperature of the top of the column, then the second stage of the distillation begins. Usually, the amount of condensate returned as reflux is reduced, permitting the column temperature in the reflux region to rise and the heavier vapor to enter the condenser. Thus, in the second stage of distillation, the remaining contents of the pot boil at the boiling point of the desired chemical product, which is a temperature higher than the original boiling of the initial water or volatile laden feed. This stage of distillation produces the product.

During the distillation, the amount of the condensate that is returned as reflux to the column is controlled by modulating a valve (the splitter previously mentioned) that directs condensate either to the column or to the condensate output line. The reflux rate is controllable according to the composition of the boiling pot as determined by the pot temperature and pressure and a control algorithm in the computer, and by the temperature at the top of the column. The condensate output line can be switched either to flow the condensation to waste, as in the first stage in the sulfuric reprocessing or purification, or to purified product, as in the second stage.

Eighth, once the end of the second stage is completed, as indicated by the lower level sensor in the column, additional feed is introduced into the column and the two stage process repeats itself. This system greatly simplifies the purification of water-containing chemicals, where the water or any water azeotrope comes off first in the distillation process, such as sulfuric acid, ammonia, or hydrochloric acid, by using only a single column for both water removal as a first stage concentration step and product chemical purification as a second stage purification step.

By knowing the concentration or composition of the liquid being distilled and monitoring the distillation conditions, for example, the temperature and pressure in the condenser, the composition of the distillate can be determined. Once the desired amount of water or other volatile has been removed in a first stage of the distillation, as determined by monitoring the temperature and pressure of the distillation, then the second stage of the distillation begins, in which the lower-boiling acid product is collected.

The actual quantity of distillate returned to reflux or removed to product or waste is controllable according to the composition of the distillate, as determined by monitoring the temperature and pressure of the distillation. By increasing the amount of reflux returned to the column as the first stage of distillation progresses, it is possible to continue to remove relatively pure lower-boiling contaminant. (The reflux keeps the higher-boiling materials from reaching the condenser.) Then, at the desired transition point, by decreasing the amount of condensate returned to reflux, the second stage of distillation is initiated. Once the second stage of distillation has progressed to the desired endpoint, additional feed is introduced into the column, and the two stage distillation repeats itself. This system greatly simplifies the purification of water-contaminated acids such as sulfuric acid by using only a single column for both water removal and acid distillation.

In one embodiment, a pneumatically or magnetically directed valve, in which the only moving parts exposed to acid are inert gas or quartz, can be used to selectively direct the flow of condensed distillate.

In another embodiment, a unique selector valve, having no moving parts, is used to minimize the generation of additional contamination by minimizing particle generation. In this embodiment, a gas stream is used to selectively divert a desired portion of condensate to determine the amount of condensate returned to reflux. Further details, objects, and advantages of the distillation/reprocessor system of the present invention is described below in connection with the Figures and Examples. However, the actual described embodiments and examples are illustrative rather than limiting of the invention.

I. Discussion of Preferred Structural Features

Figure 1A:
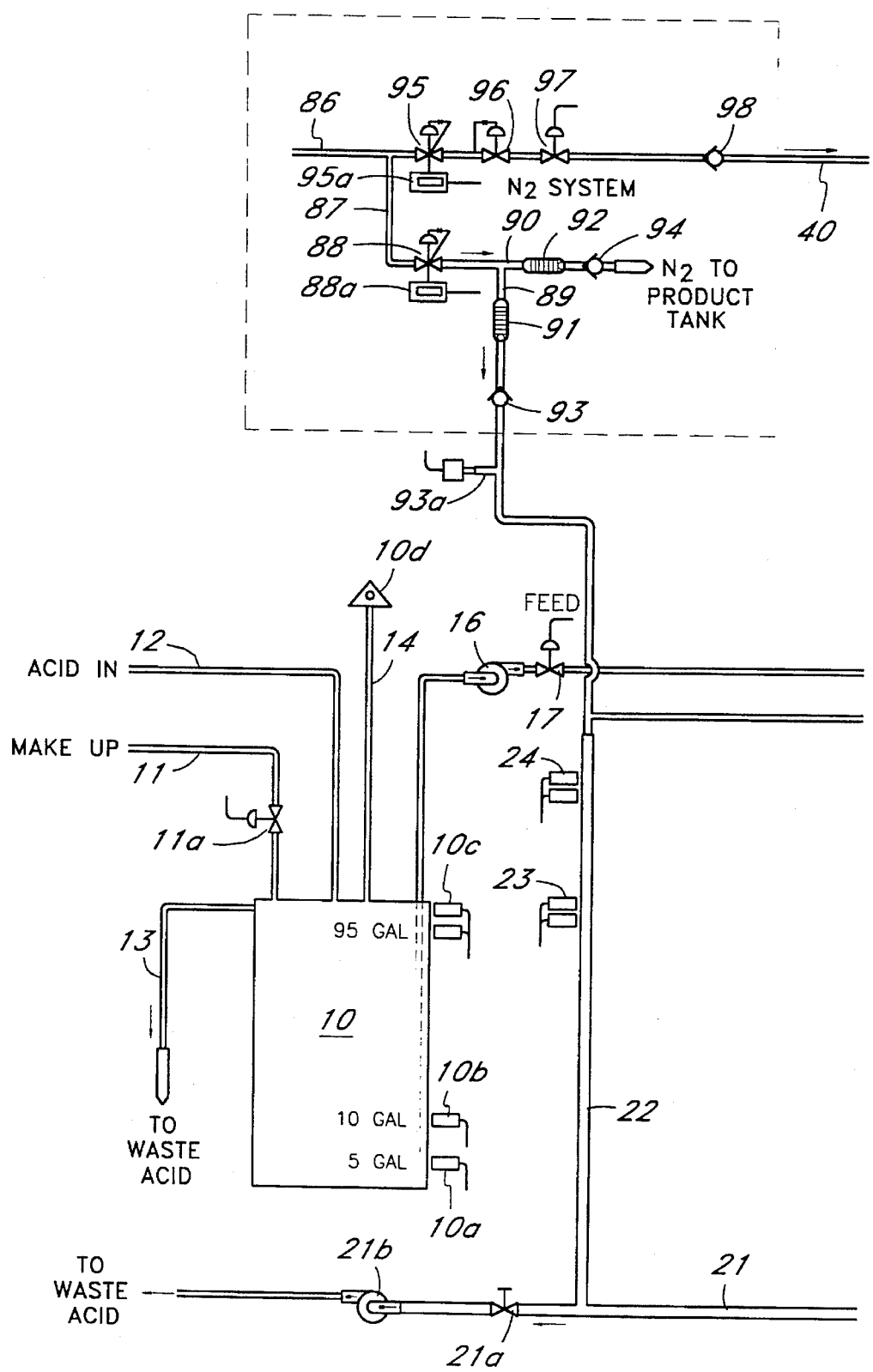
FIGS. 1a, 1b 1c are all part of FIG. 1, and for viewing are to be arranged in side-by-side relationship, from left to right, as one unitary FIG. 1.
Figure 1B:
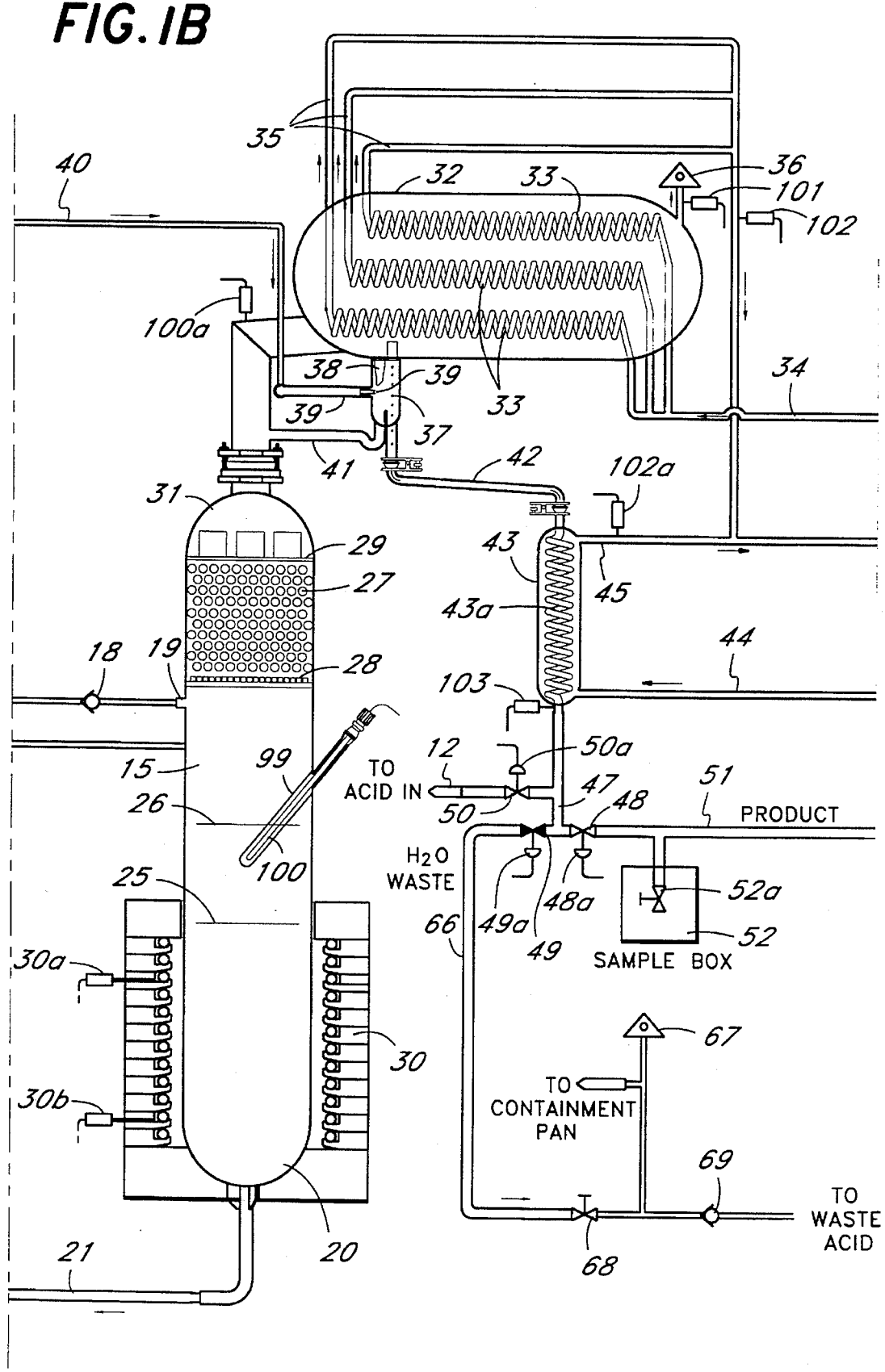
Figure 1C:
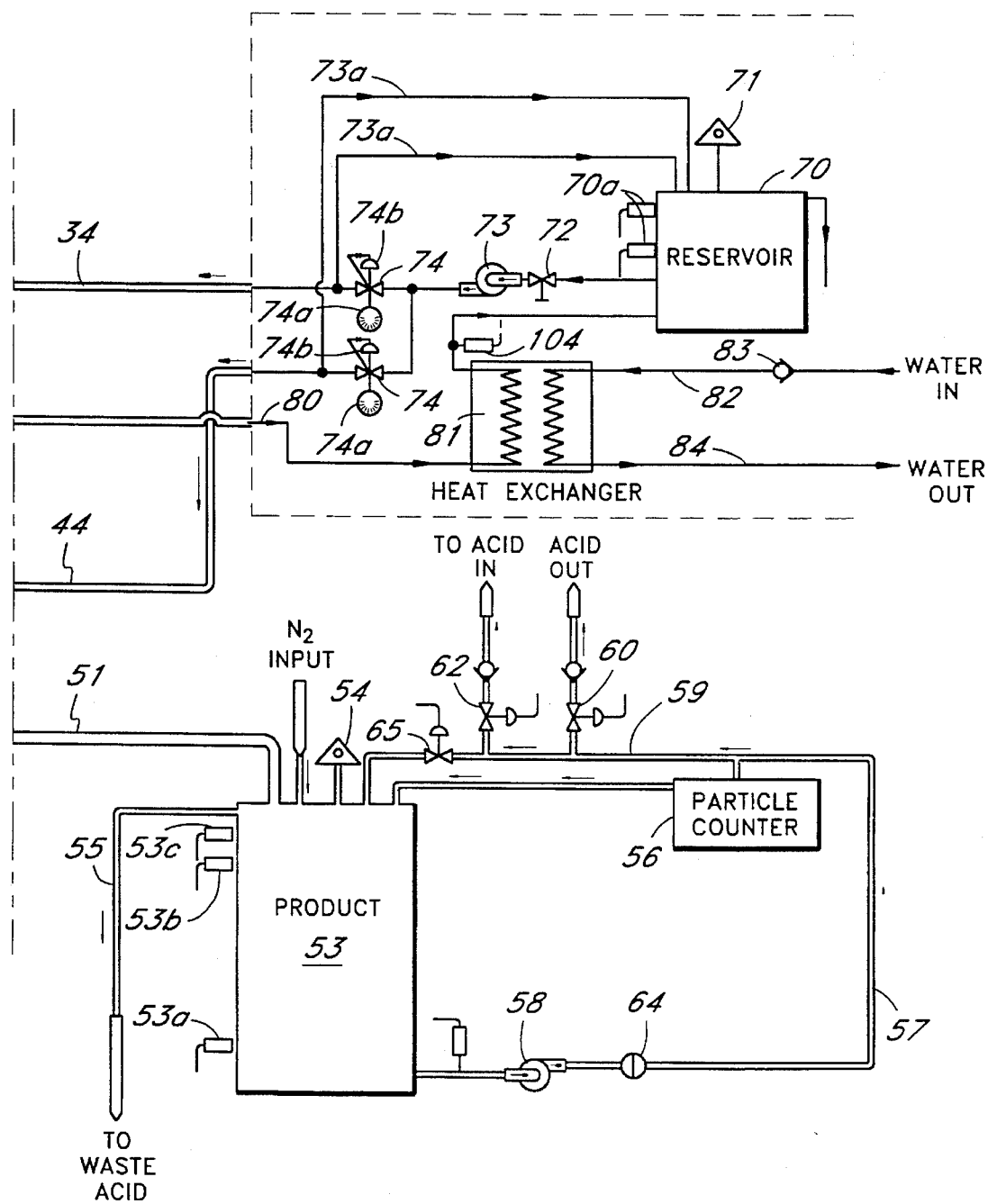

FIG. 1 is a schematic diagram of the process apparatus of a preferred embodiment of the present invention. FIGS. 1a, 1b, and 1c are all part of FIG. 1, and for viewing are to be arranged in side-by-side relationship, from left to right, as one unitary FIG. 1. It is to be understood that, although a particular implementation of the invention is described, many other equivalent implementations and alternative implementations are possible.

In a particularly preferred embodiment, most or all of the components of the invention are all included in a single housing. These components may include one or more of the following: a feed system including a storage tank, with an external connection to contaminated feed material; a gas system with an external or internal connection to a gas source; a distillation column with a condensor and optionally a subcooler; a cooling system including a heat exchanger with an external connection to an external source of coolant (such as water) whereby the internal heat exchanger isolates the process coolant from the external coolant source; and a product collection and storage unit, preferably including a pump and a filtration loop, with an external connection for delivering ultra-pure product, preferably pressurized by a pump, to the user. A process control system is also preferably provided, and can be internal, external, or may comprise an internal controller actuated by and responsive to an external programmed computer, so that a data connection is provided in the aforementioned housing.

Particular components of one exemplary system will now be described in greater detail.

A. Feed System

At the left side of FIG. 1, a feed reservoir 10 is provided having a make up line 11, an acid in line 12, a waste line 13, and a feed line 14. The make up line 11 is used to maintain a relatively constant volume of acid in the system, making up for losses of acid in the purification process. Through acid in line 12, used acid to be purified is introduced into the feed reservoir 10. The make up line 11 has an associated pneumatic valve 11a that may be actuated to introduce new acid.

The waste line 13 allows waste acid to drain from the feed reservoir 10 if the reservoir 10 is accidentally overfilled in the event of a failure of the control system.

Level sensors 10a, 10b, and 10c each allow feedback on the level of feed in the reservoir 10. A vent 10d is used to prevent the feed reservoir 10 from developing a vacuum when feed is withdrawn to the distillation column 15 or a pressure when the reservoir 10 is being filled. In this regard, the feed line 14 is used to communicate the contaminated acid feed from the feed reservoir to the distillation column 15.

The feed from the feed reservoir 10 is preferably pumped through the feed line 14 through pump 16 and into the upper portion (i.e., preferably upper third of the column) of the distillation column 15 through feed inlet 19. The feed line 14 also preferably has an associated pneumatic valve 17 and a check valve 18 to shut off the feed to prevent drainage of feed back to the feed reservoir 10 and keep the pump 16 primed.

B. Column System

From the feed inlet 19, the feed freely flows into the distillation pot 20 of the column 15 where it also fills the purge line 21 and the sight tube 22. High and low level sensors, 23 and 24, respectively, in the sight tube 22 are used to monitor and control the level of the feed in the distillation pot 20 of the column 15. Typically, the feed is fed from the feed reservoir 10 through feed line 14 until the liquid level in the distillation pot 20 reaches a high level 26 as determined by the high level sensor 24 in the sight tube 22. The feed is shut off through use of the pneumatic valve 17 in the feed line 14. Also, during distillation, when the liquid level reaches the low level position 25 in the distillation pot 20 in the column 15, as determined by the low level sensor 23 in the sight tube 22, new feed can be introduced from the feed reservoir 10 through the feed line 14 and a new batch is again purified, first by removing water and second, by distilling the acid. Alternatively, if the product tank 53 is full or the feed tank 10 is empty, the system may go into an isolation mode by returning all of the condensate to the column. The isolation mode can be run for a predetermined length of time until losses in the system cause the liquid level to fall below the lower level sensor. At this time, the system may go into a shutdown mode, where the heat to the column is turned off, thus discontinuing distillation.

In one preferred embodiment, a packing support plate 28 is provided in the column 15, with the feed inlet 19 usually feeding into a point below the support plate 28, although it is also contemplated that feed can be directed into the packing. Higher in the column 15 a reflux distributor 29 is also provided. The column is preferably filled with packing material between the packing support plate 28 and the reflux distributor 29. Preferred packing materials include Raschig rings, Lessing rings, Berl saddles, spiral partition rings, and grid packing. Most preferably, the packing materials are Raschig rings.

Surrounding the distillation pot 20 is a heater 30. In preferred embodiments, the heater 30 is a resistance heater surrounding the lower portion of the distillation pot 20. As will be appreciated, however, a variety of heat sources would perform suitably in the present invention. For example, the heat source may include direct and indirect heat sources. Examples of direct heat sources that may be suitably employed in the present invention are electric immersion heaters, other heat exchangers, or external electric heat sources, or through burning fossil fuels or petroleum based products. Indirect heaters are those wherein a material is heated elsewhere and transported into or around, for instance, the distillation pot 20, such as steam or oil. One advantage of the present invention is that the heater can be operated at a constant heat output throughout the entire operation. This permits the optimization of heater size and results in significant cost and space savings.

C. Condenser System

The top 31 of the column 15 is in communication with a distillate condenser 32. The condenser 32 has one or more cooling coils 33, each with associated cooling liquid inlet lines and outflow lines, 34 and 35, respectively. The condenser 32 is also vented through a vent 36 to allow pressure regulation in the system.

The condenser also has a valve to direct the flow of condensate, to either return a all or a desired portion of condensate as reflux to the column 15 or to send at least a portion of the condensate to product collection 51 or waste discharge 66. In a preferred embodiment, such means comprises a stream splitter 37. The stream splitter 37 preferably includes a nipple 38 and a gas nozzle 39 connected to a gas line 40. The condensate from the condenser 32 runs into the nipple 38 and falls past the gas nozzle 39. When no gas is flowing through the gas line 40 into the nozzle 39, the condensate will fall into the reflux line and be returned to the distillation column 15. However, if a gas is communicated through the gas line 40 into the nozzle 39, the stream of condensate can be deflected and, rather than falling into the reflux line 41, all or a portion may be diverted to fall into the product/waste line 42.

Accordingly, the system can control the destination of the condensate by modulating the gas flow in gas line 40, through use of appropriate automatic control technology, and direct portions of the condensate back to the column to provide the necessary reflux or to the product/waste line 42 to be recovered as product or sent to waste as appropriate. The automation of the system by computer control is preferably implemented in such a way as to not preclude manual operation of the system a human.

D. Product/Waste Collection/Removal

Assuming that the stream splitter 37 is in operation and it is modulating the condensate between the column for reflux and the product/waste line 42, the part of the condensate that is directed to the product/waste line 42 is advantageously communicated to a subcooler 43. The subcooler 43 is arranged, in a preferred embodiment, with helical coils 43a. It is preferred that the subcooler be elevated with respect to the product tank 53 and the feed reservoir 10, so that hot acid can be directed to either location without the use of pumps. The subcooler 43 is cooled by cooling liquid from cooling liquid inlet line 44 and outflow line 45. The coils 43a of the subcooler 43 are vented through a vent 46, generally, at the top of the subcooler 43 to provide smooth, continuous flow of the condensate through the coils 43a. Although it is possible to eliminate the subcooler 43 by cooling the condensate more in the condenser 32, use of a separate subcooler results in more efficient operation of the system by requiring less heat input into the column to reheat relatively cool condensate returned to reflux.

At the bottom of the subcooler 43, the condensate reaches a junction 47 of three alternative lines, controlled by a product valve 48, a waste valve 49, and an acid-in valve 50. (The acid-in valve 50 is used to return an initial portion of the acid product collected back to the feed tank 10 so that the control computer executing programmed algorithm instructions, can provide for the self-cleaning of the system upon automatic startup before directing chemical to the product tank 53.

1. Product Collection

Product is collected and handled as described below. A product line 51 carries product from the condenser 32 and the subcooler 43 to the product valve 48. The product valve 48 is preferably a pneumatic valve and, upon actuation directs the condensate for product collection through a product line 51. A sample box 52 is preferably in communication with the product line 51 to allow collection of samples for quality control. A computer controlled valve and the control computer executing an algorithm sequence is preferably used for this purpose, however, a hand valve may suffice. The product reservoir 53 has associated low (53a) and high (53b and 53c) level sensors for determining the amount of product collected. The product tank 53 is also preferably vented with vent 54 to prevent the accumulation of vacuum or back pressure. The product is preferably tested for the presence of particles in a particle counter 56. In one preferred embodiment, the product circulates continuously through product line 57 and a filter 64. When the filtered product is sufficiently clean, as indicated by the particle counter 56, product can be withdrawn through a pure product valve 60, preferably a pneumatic valve. Otherwise, the product continues to be directed back into the product tank 53 through a back pressure regulator 65. Clean product from the product tank having no more than a predetermined level of particulates may be withdrawn in response to an external signal through the pure product line 59, as described above. Alternatively, product can be diverted through an acid recycle valve 62 back to the feed tank 10, particularly during start up and self cleaning procedures, which are preferably automatically controlled by a process control computer.

2. Waste Removal

Back at the junction 47, it will be recalled that an option is also available to discharge condensate as waste during the concentration mode. This is accomplished through opening the waste valve 49 which is in communication with the waste line 66. The waste line is vented with a vent 67 to prevent the accumulation of backpressure in the line. A second manual or automatic waste valve 68 and an associated check valve 69 are used to drain the waste from the system.

E. Cooling System

In order to provide cooling liquids to the condenser 32 and the subcooler 43, the system is preferably provided with a closed loop cooling system. A closed loop cooling system, in which the cooling water or other liquid is used only in the present system, and not in other equipment, prevents contamination of the building's main cooling water system in the event of a failure of the cooling coil. The cooling system includes a cooling liquid reservoir 70 which is vented with a vent 71 to prevent the accumulation of backpressure or vacuum. Also, the reservoir has one or more associated level sensors 70a to ensure that a sufficient quantity of cooling liquid is available to cool the system.

The cooling liquid is communicated from the reservoir 70 through a valve 72 to a pump 73. From the pump 73, the liquid is communicated to one or more pressure gauges 74a and pressure regulators 74b to control the pressure of the liquid from the pump 73 to the condenser 32 or the subcooler 43. If pressure is too high, the liquid is recirculated to the reservoir 70 through lines 73a by closing downstream valves (not shown). Cooling liquid of the appropriate pressure is communicated from the pressure valves 74 and ultimately to the cooling liquid inlets, 34 and 44, for the condenser 32 and the subcooler 43, respectively.

The outflows from the condenser 32 and the subcooler 43 through cooling outflow lines 35 and 45, respectively, converge on return line 80 to the heat exchanger 81, ultimately passing to the cooling liquid reservoir 70. The heat exchanger 81 is cooled by an external flow of liquid through inlet 82 and outflow 84 which are controlled by the pressure relief valve 85.

F. Gas System

In one preferred embodiment, the distillation apparatus includes a nitrogen or other inert or nonreactive gas system for use in the distillation column 15 and the product tank 53. Maintaining the acid in the product tank 53 under purified nitrogen prevents absorption of contaminants from the room air. In addition, in a preferred embodiment, the nitrogen system is also connected to and actuates the stream splitter system 37, as mentioned above. Each of these features is accomplished through the use of a nitrogen supply line 86 which is in communication with the gas line 40 which is used to operate the stream splitter 37, as well as a system gas line 87. The system gas line 87 is controlled by a regulator valve 88 with an associated digital pressure switch 88a. The supply of gas flowing through the system gas line 87 is split into a column gas line 89 and a product gas line 90. Each of these lines have associated flow meters with needle valves 91 and 92 and check valves 93 and 94, respectively. The column gas line also preferably has an in line pressure sensor 93a (used for assay control).

The stream splitter 37, as mentioned, is actuated from the nitrogen supply line 86 through the gas line 40. The gas line 40 is controlled by a regulator valve 95 with an associated digital pressure switch 95a, a pressure relief valve 96, a pneumatic valve 97, and a check valve 98. Accordingly, once the appropriate pressure is established with the regulator valve 95, the pneumatic valve 97 can be actuated to allow the gas to flow from the nitrogen supply line 86 through the gas line 40 to deflect a stream of condensate flowing through the stream splitter 37. Any extremes in pressure are accounted for with the pressure relief valve 96.

G. Temperature Monitoring System

As described above, a useful way to monitor and determine the distillation conditions in the system is through the temperature at various positions in the system. Accordingly, in a preferred embodiment, the system includes a plurality of thermocouples or other temperature indicators means at key positions in the system. In a preferred embodiment, therefore, the system includes a well 99 in the distillation column 15 that includes a thermocouple 100. Also, a thermocouple 100a may be mounted at the top of the column, preferably at the inlet to the condenser 32, and another thermocouple 101 may be mounted on the condenser 32, preferably in the vent 36. These thermocouples, in combination, assist in monitoring the operation of the distillation system, allowing determination of the chemical make-up of the vapor phase during the distillation.

The temperature of the heater 30 is also monitored by thermocouples 30a and 30b to ensure that the system does not overheat and experience melt-down.

Temperatures in the cooling system are also preferably monitored. For example, in the outflow line 35 of the condenser 32 and the outflow line 45 of the subcooler 43. This is accomplished in a preferred embodiment with thermocouples 102 and 102a, respectively. Such thermocouples allow the operator to ensure that the materials passing through the condenser 32 and the subcooler 43 are being cooled sufficiently. Also, the temperature of the cooling liquid in the cooling system after passing through the heat exchanger 81 is preferably monitored to ensure that the liquid is sufficiently cool enough to be effective. To this end, a thermocouple 104 is installed in the line between the heat exchanger 81 and the cooling liquid reservoir 70.

Additionally, the temperature of the condensate flowing through the product or waste line 42 after flowing through the subcooler 43 is preferably also monitored. In a preferred embodiment, this is accomplished with a thermocouple 103 mounted in the line after the subcooler 43. Such thermocouple allows a cross check with the thermocouple 102 to ensure that the temperature of condensate is cool enough and that the subcooler 43 is operating efficiently.

H. Computer Control System

Figure 7:
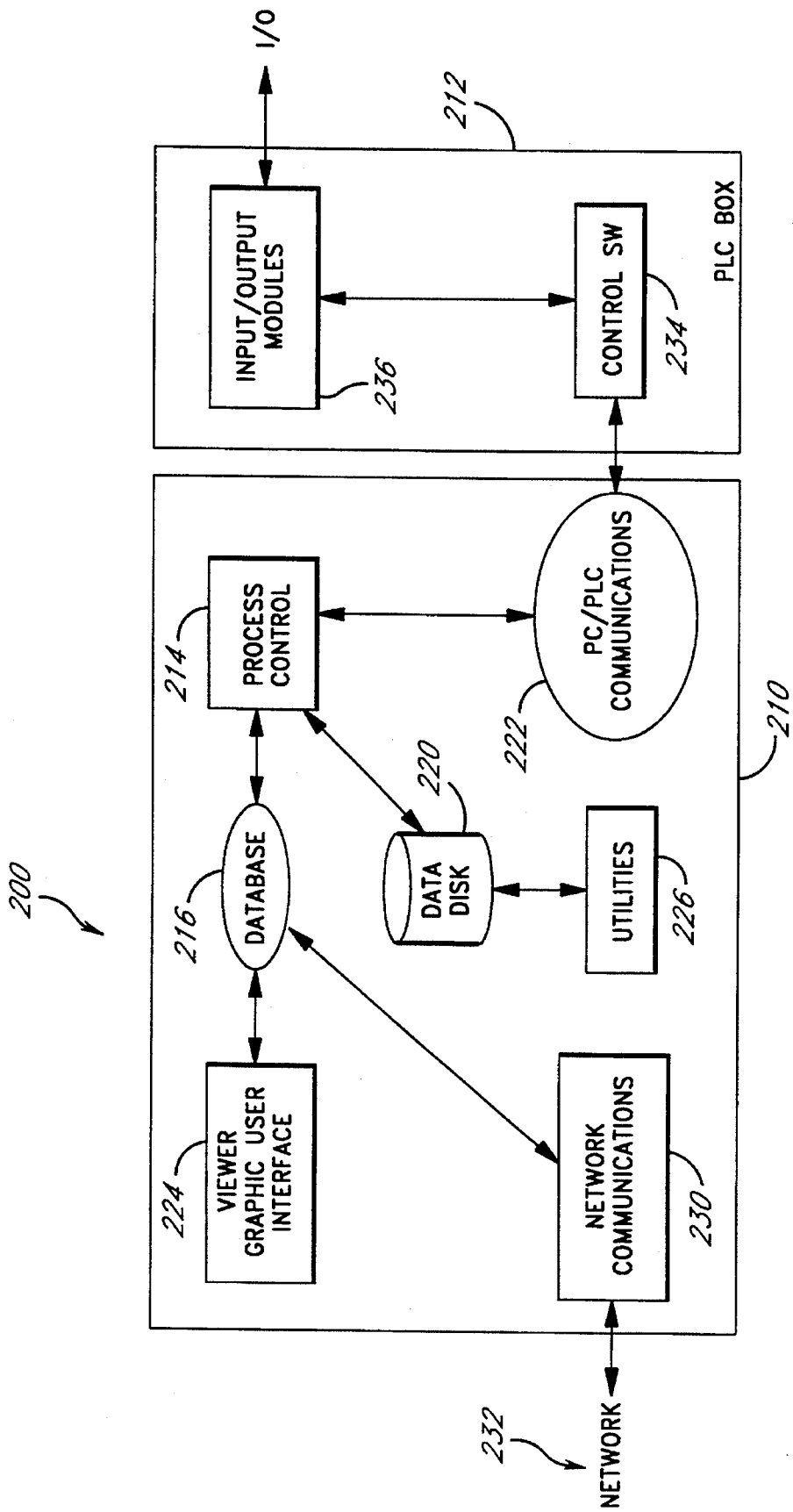
FIG. 7 is a block diagram of a computer control system for the apparatus of the present invention.

As discussed above, the preferred way to automatically control all of the aspects of the purification and/or reprocessing system is with a control computer system. FIG. 7 shows a block diagram of the preferred computer control system. One skilled in the art can easily envision other computer control systems that accomplish the same functions.

This computer control system analyzes all of the sensor inputs and controls the system valves and pumps by executing algorithmic instructions based upon which state the system is in and which function or mode it is performing. The modes are:

Startup: Involves, filling the column, heating the furnace, and then going into normal production mode.

Isolation: The stand-by mode to keep the system ready without producing chemical, in case no chemical is required or no feed is available.

Production: Involves delivering the purified chemical. This involves the concentration phase where the light contaminant (water) is removed and the purification phase where the product is delivered.

Shutdown: Involves a complete and safe shut-down of the entire system. All components are placed in a safe state and remain so until a plant service personnel can intervene.

II. Discussion of Preferred Features in Structure

Several features of the above-described design merit additional discussion. In particular, the design of the reflux distributor 29 and the stream splitter system 37 provide superior operation of the present invention. Like reference numerals are used for components that are discussed above.

A. Reflux Distributor Design

Figure 2:
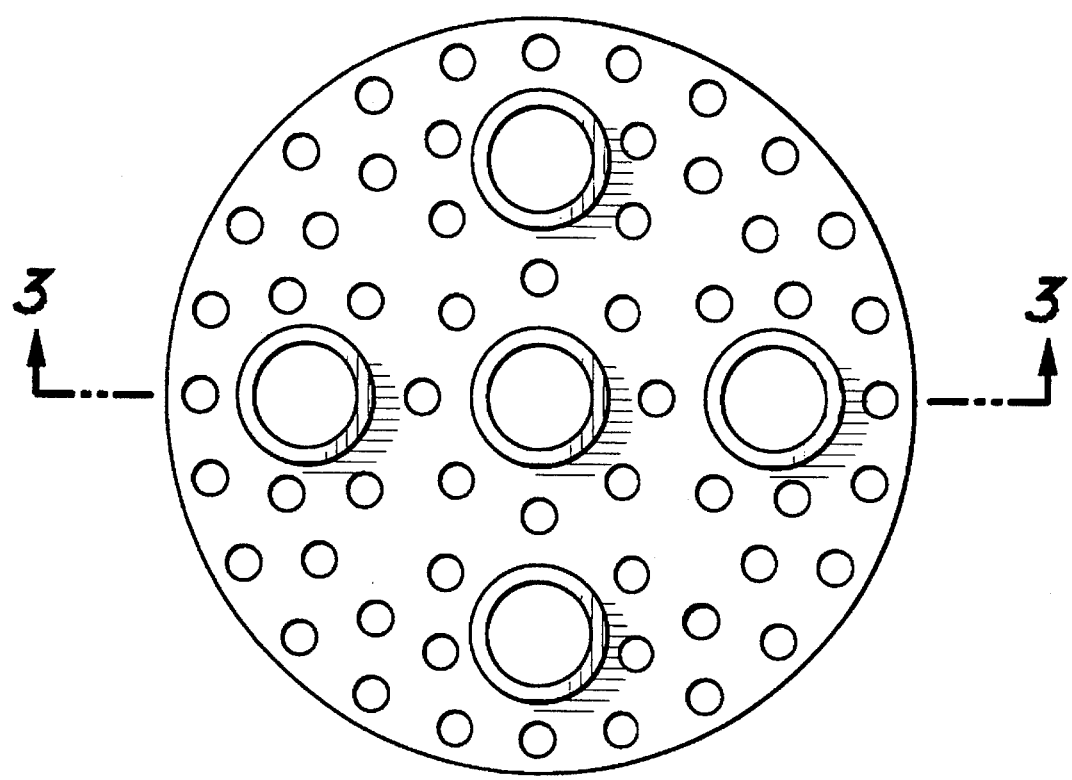
FIG. 2 is a top view of a preferred reflux distributor of the present invention.

A preferred design for the reflux distributor 29 in FIG. 1 is shown in FIG. 2, which is a top view of a preferred reflux distributor in accordance with the invention. The reflux distributor is preferably a quartz disc having a plurality of perforations 105 that allow fluid communication from one side of the reflux distributor to the other. Also, several projecting tubes 106 are provided on the top side 107 of the reflux distributor 29.

Figure 3:
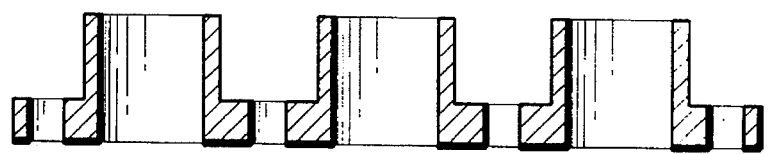
FIG. 3 is a side cross-sectional view of the preferred reflux distributor of the present invention, taken along line 3—3 in FIG. 2.

FIG. 3 is a side cross-sectional view of a preferred reflux distributor in accordance with the invention taken along line 3—3 in FIG. 2. From this view, the arrangement of the projecting tubes 106 extending from the top side 107 of the reflux distributor 29 can clearly be seen. When placed in the distillation column (15; FIG. 1), the bottom side 108 of the reflux distributor sits immediately proximate to and above the packing in the column. As will be appreciated, condensate as reflux that is communicated back to the column contacts the top side 107 of the reflux distributor 29 before entering the packed section of the column.

The condensate will generally be communicated through the perforations 105 in the reflux distributor 29. The perforations 106 further aid in maintaining a steady flow of the condensate back to the column as reflux without allowing channel of reflux through the packing material. As will be appreciated, when reflux streams are allowed to channel through the packing material, the efficiency of the column is reduced. At the same time, the projecting tubes serve the function of allowing steady passage or flow of the vapor phase towards the condenser (32; FIG. 1). However, when large quantities of condensate are present, any condensate that pools on the top side 107 of the reflux distributor 29 can flow through the projecting tubes 106.

B. Stream Splitter

The importance of the stream splitter to the present invention is in creating a way in which the control computer through executing control algorithms can automatically modulate the splitter valve to provide precisely the different reflux rates required by the column, under various conditions, while also providing the flow of condensate to the product/waste line 42. This means and method provides the ability to maximize the yield of chemical product and efficiently and automatically operate the system.

1. Gas Operated

Figure 4:
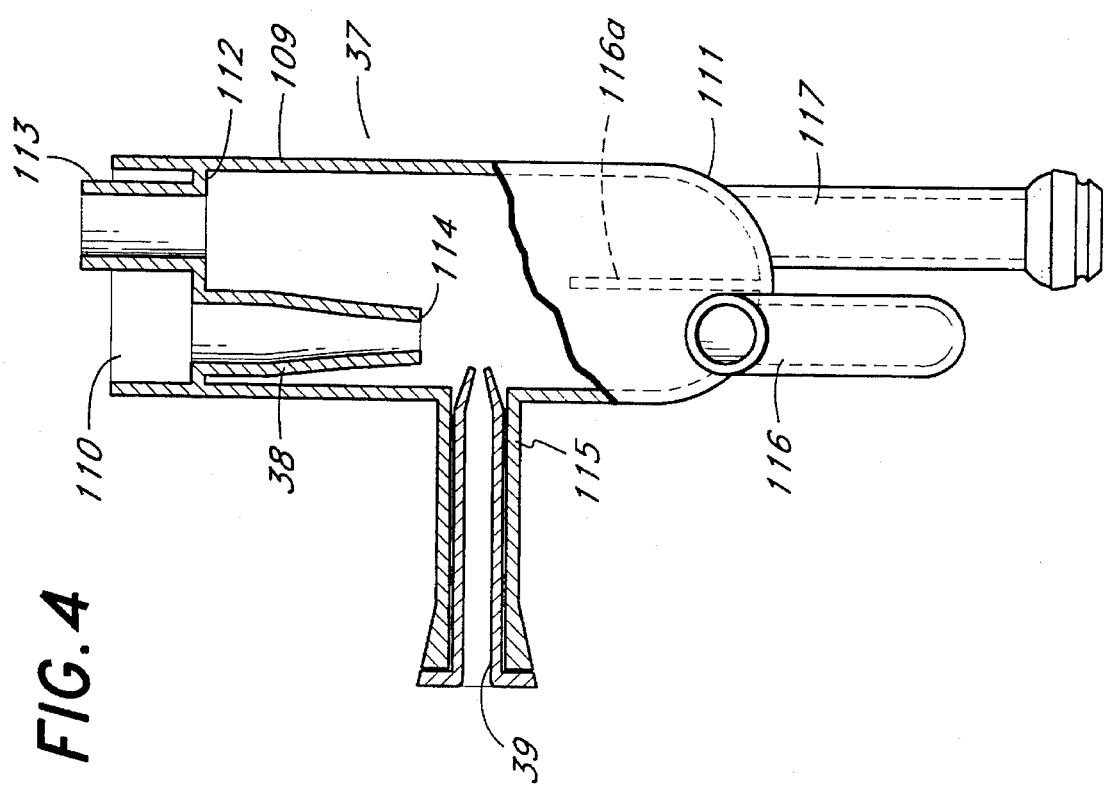
FIG. 4 is a side cross-sectional view of a preferred stream splitter in accordance with the present invention.

As described above, in a preferred embodiment of the invention, a stream splitter is utilized as the means to select whether the condensate stream is returned as reflux or whether the stream is removed to product or waste. A preferred embodiment of the stream splitter of the present invention is shown in FIG. 4.

The stream splitter 37 includes a housing 109, which is preferably cylindrical and preferably includes an open end 110 and a closed end 111. The open end is positioned in fluid communication with the condenser (32; FIG. 1). A transverse wall section 112 closes the open end 110. The transverse wall section 112 includes a projecting tube 113 which provides fluid communication through the wall section 112 and that extends toward the open end 110. The transverse wall section 112 also includes a nipple 38 that extends away from the open end 110 and towards the closed end 111. Like the projecting tube 113, the nipple also provides fluid communication through the wall section 112.

Preferably, the nipple 38 is shaped or contoured to effectively allow drops or streams of condensate flowing from the condenser (32; FIG. 1) to pass through a portion of the nipple 38, i.e., the tip 114. As such, the drops or stream of condensate will drop past the gas nozzle 39 that is mounted in a port 115 in the stream splitter 37. As described previously, a supply of gas can be provided to the nozzle 39 through the gas line (40; FIG. 1) to cause the drops or stream of condensate to be deflected. Alternatively, when no gas is flowing, the drops or stream of condensate will fall straight from the nipple 38.

In the event that no gas is flowing through the nozzle 39, the condensate falls directly in a reflux collector line 116 which provides fluid communication through the closed end 111 of the housing 109. In this case, the condensate will flow through the reflux collector line 116 and back into the column (15; FIG. 1) as reflux. If, however, a supply of gas is provided through the nozzle 39, a desired portion of the condensate can be deflected over a divider wall 116a and fall into a product/waste collector line 117 which also provides fluid communication through the closed end 111 of the housing 109. In this case, the diverted condensate will be removed from active participation in the distillation system as either waste or product through the waste or product line (42; FIG. 1).

Figure 5:
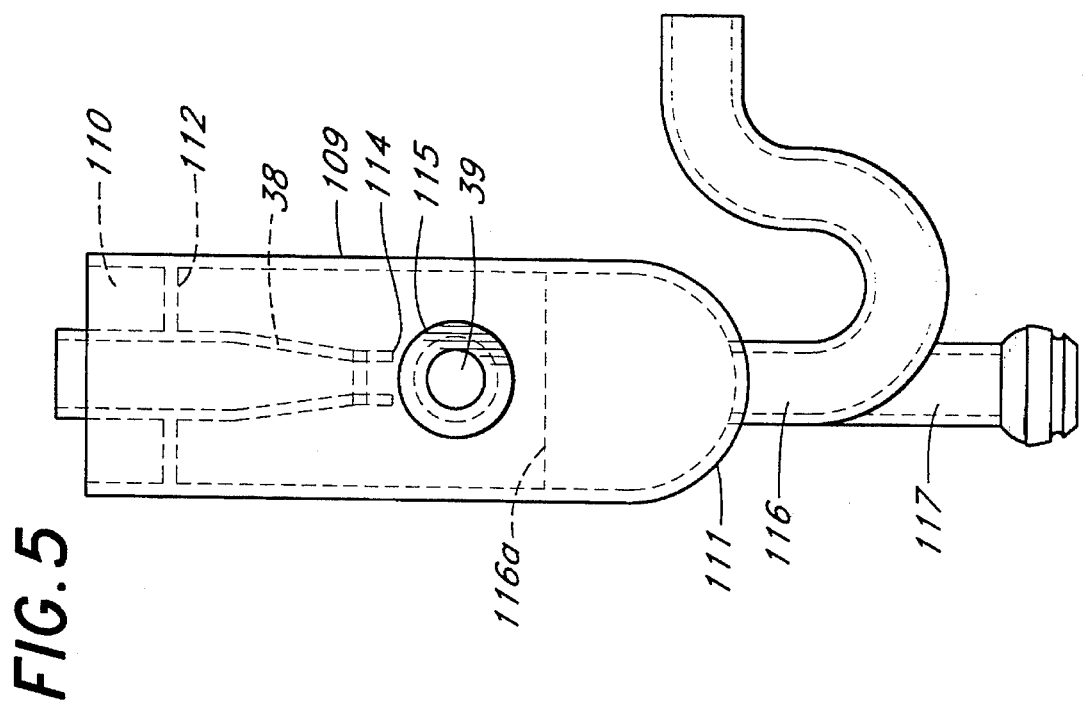
FIG. 5 is a side cross-sectional view of the reflux stream splitter in FIG. 4, rotated 90°.

In FIG. 5, a side cross-sectional view of the reflux stream splitter in FIG. 4, rotated 90°, is provided. The Figure allows a clearer view of arrangement of the reflux collector line 116 in a preferred embodiment.

An advantage of the gas operated reflux stream splitter of the invention is that there are no moving parts required, which is highly desirable in acid reprocessing. It is a common perception in the industry that reprocessed acids should be substantially free of all particles. Therefore, it is conventional to limit the contact of purified acid with materials other than quartz and glass (particularly when the acid is hot). (Even moving quartz parts, such as the stream splitter illustrated in FIG. 6, may generate some particulates.) The gas operated stream splitter of the invention is at a point in the reprocessing system where the temperature can rise to 300° C. As such, it is preferably manufactured from quartz which can resist even sulfuric acid at such temperatures and, having no moving parts, will not introduce any particles or impurities into the system.

2. Externally Actuated

Figure 6:
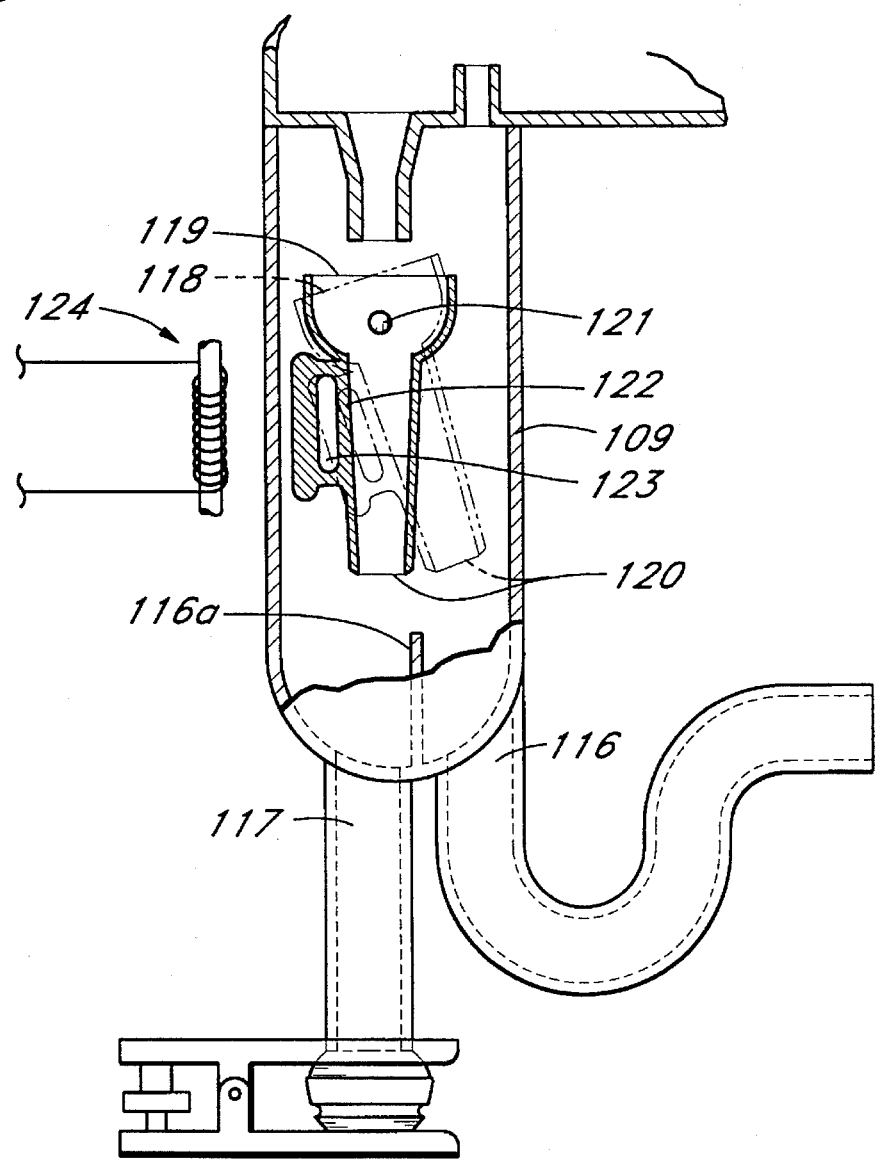
FIG. 6 is a side elevation view of another preferred stream splitter in accordance with the present invention.

An alternative embodiment of the stream splitter of the invention is shown in FIG. 6. This stream splitter comprises a hinged tube that is externally actuated. In other words, the tube can be diverted to change the flow path of the condensate through the application of an external electromagnetic field.

In the embodiment, a divertable collector 118 is provided that has a collector end 119 and a liquid directing end 120. It is hinged through post 121 which rests in receptacles (not shown) in the housing 109. A magnet 122 is nested in the face 123 of the collector 118 and is preferably entirely encased in the quartz or other material from which the collector 118 is made. The collector 118 can pivot in response to a magnetic field, to direct condensate to either the product/waste collection line 117 or the reflux collector line 116. An electromagnet 124 placed in proximity to the collector 118 provides a magnetic field to divert the collector so that condensate will fall into the appropriate line and be returned as reflux or removed as product or waste.

With this system, there is a slightly higher chance that particles will enter the system than with the gas operated reflux stream splitter. However, through appropriate choice of construction materials, this problem is minimized. For example, as will be appreciated by those of skill in the art, quartz, sintered carbon, graphite, and sapphire all exhibit high resistance to hot sulfuric acid. For systems used to purify less corrosive materials, a variety of synthetic polymer materials can be used. Such materials include polyvinyldifluoride ("PVDF") polymers as well as certain high temperature teflons and other materials.

III. Operation of the Preferred Apparatus of the Invention

Figure 8:
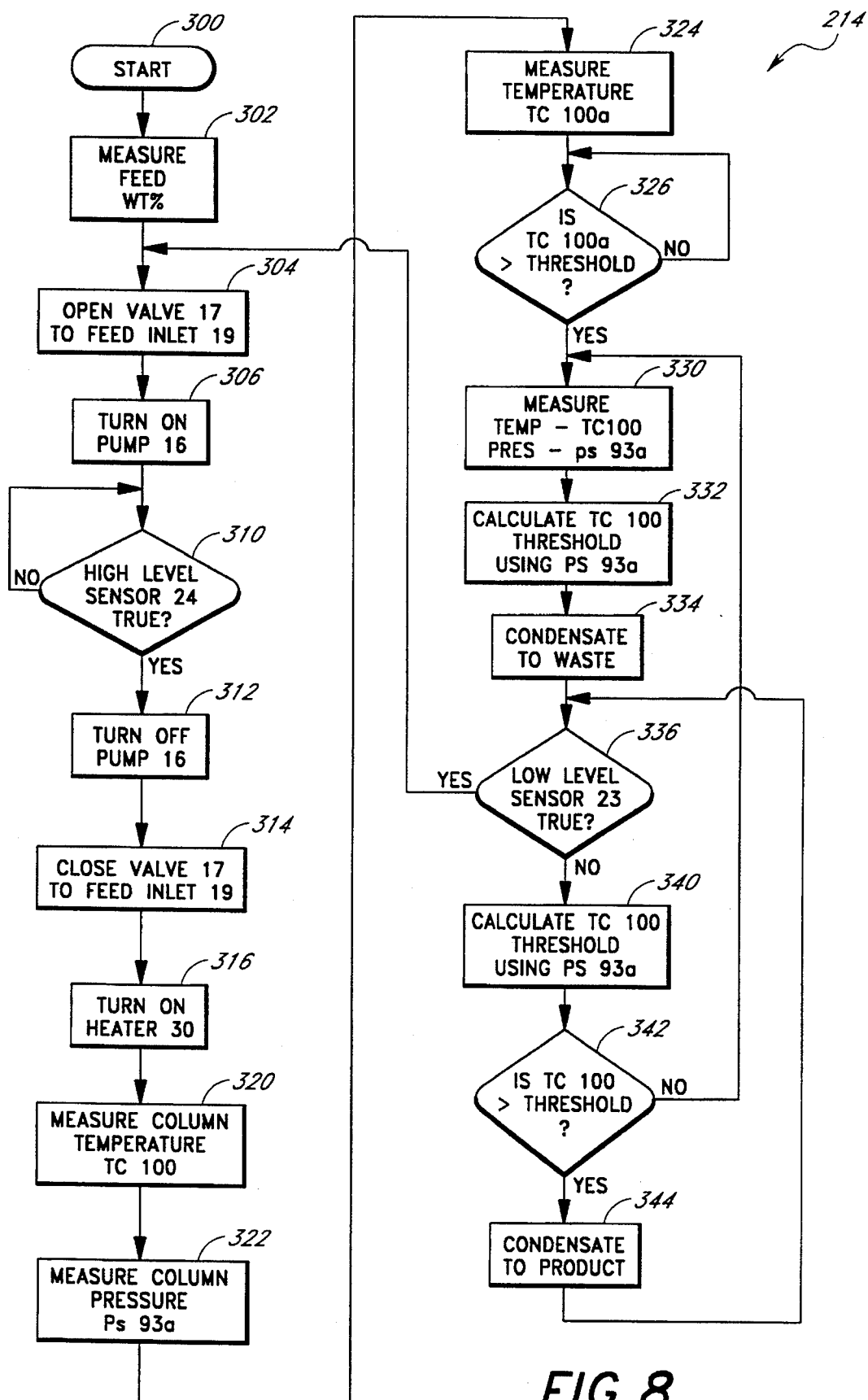
FIG. 8 is a high level flow chart for one embodiment of software for controlling the process of the present invention.

In operation, the preferred apparatus and method achieves purification and/or reprocessing through a multimode batch operation that includes a variety of steps. Each mode and individual step in the process is under the control of the control computer system and system software. These features of the system are described below in connection with the apparatus of FIG. 1. In a preferred embodiment, the automatic operation of the invention is achieved through the use of a computer system and software to monitor, integrate, and control the components. Such automatic control can be accomplished in a variety of ways, which are apparent to those of ordinary skill in the art and can be implemented without undue experimentation. A high level flow chart of system software is shown in FIG. 8 and described in more detail below.

FIG. 7 illustrates a block diagram of one embodiment of a computer control system that may be used in connection with the present invention. With reference to FIG. 7, a computer control system 200 is provided. The computer control system preferably includes a programmed personal computer 210 controlling the operation of a programmable logic controller (PLC) 212. Any suitable personal computer (or other computer) may be used in place of the personal computer 210. Functionally, the personal computer 210 may advantageously include process control software 214 which has the ability to access a database 216, a data disk 220 (which may include the database 216), and a communications module 222 (such as an I/O board or interface), for communicating with the PLC 212. The computer 210 also advantageously includes a graphical user interface module 224, for graphically displaying program status and equipment operation and for permitting human control, interaction, and/or intervention in the process. Various standard utilities 226 may be provided on the data disk 220 or associated therewith, and may include the ability to upgrade the process control software or install custom modules and utilities. In one particular preferred embodiment, a network communications module 230 may be provided to enable communication with a network 232 in a conventional manner.

The process control software 214 directs the communications module 222 to communicate desired control functions to control software 234 in the PLC 212. Conventional commercially-available PLCs typically include standard or built-in software, which may be used to advantage in the present invention. The PLC control software 234 directs input and output modules 236 that directly interface with the control and measurement devices in the apparatus, as previously described. Control and measurement elements of the distillation apparatus (FIG. 1) of the present invention include, for example, the temperature and pressure measuring elements, pumps, valves, flow controllers, heaters, and the like.

With respect to the computer control system 200 of the present invention, the personal computer 210 may advantageously be an Intel 80486-based DOS or UNIX system. The data disk 220 may be a fixed or removable disk. The graphic user interface may advantageously be, for example, the Microsoft Windows System. The PLC 212 may be selected from any of the numerous commercially available PLCs. The network communications module 230 may, for example, be a token ring network card or any other suitable network interface card. Of course, it will be understood that many different types of computers, including dedicated or pre-programmed computers, may also be used in the computer control system 200.

FIG. 8 is a program flow diagram illustrating one implementation of the process control software 214 of the present invention. FIG. 8 will be discussed in conjunction with the distillation apparatus of FIG. 1.

The process control software 214 illustrated in FIG. 8 includes a start module 300 which may be initiated upon power-up of the computer control system 200 and/or the distillation apparatus. A feed measurement module 302 determines the concentration of acid in the feed tank 10. This value is then stored in the computer 210. Next, a feed valve module 304 opens the feed valve 17 to permit acid feed stock to enter the feed inlet 19. At the same time or sequentially, a feed pump module 306 actuates the feed pump 16 to begin filling the column 15. The program then loops at the decision box 310 until the high level sensor 24 indicates that the liquid level in the column has reached the liquid level sensor 24, at which point a pump off module 312 turns off the feed pump 16 and a close valve module 314 closes the feed valve 17. Control passes to a heater on module 316, turning on the heater 30 to begin warming the contents of the column 15. Measurement modules 320, 322, and 324 then measure the column temperature below the packing (essentially the liquid temperature) using thermocouple 100, the column pressure using the pressure sensor 93a, and the temperature of the gases entering the condenser, using thermocouple 100a, respectively. The program then loops at decision box 326 until thermocouple 100 or thermocouple 100a, as adjusted for the column pressure, indicates that water vapor has begun entering the condenser 32. (At standard atmospheric pressure, the threshold temperature measurement at thermocouple 100a would be 100° C. The same or slightly higher temperature at thermocouple 100 would provide a similar indication.)

Once the pre-determined threshold (stored in a temperature/pressure look-up table in the database 216 or as determined by an appropriate process control algorithm) has been reached or exceeded, program control passes to measurement and calculation modules 330 and 332 to calculate whether temperature (thermocouple 100) and pressure (pressure sensor 93a) together indicate that water is being condensed, and a waste module 334 opens appropriate valves to direct the flow of condensate to waste. (Preferably, a reflux control module (not shown) simultaneously directs a portion of the condensate back into the column through use of the splitter 37. The proportion of condensate directed back into the column as reflux is determined based on the temperature at thermocouple 100 and the pressure at pressure sensor 93a, which are used to retrieve a value from an empirically determined look-up table or a process control algorithm. As the temperature at thermocouple 100 increases, more and more condensate must be returned as reflux in order to maintain the temperature at thermocouple 100a at the desired level, ensuring that water, not acid, is the primary condensate.)

As program control passes through a decision box 336, the low level sensor 23 is interrogated to determine whether the liquid level in the column 15 has dropped to the low level sensor 23. When that low level is reached, program control returns to the feed module 304, and the column is refilled in preparation for initiating a new batch distillation. So long as the liquid level is above the low level sensor 23, the program, via switch point module 340, uses the values reported by thermocouple 100 and pressure sensor 93a to calculate whether a pre-determined switch point threshold has been reached. Then, decision box 342 either loops program control back to measurement module 330, in which case water continues to be directed to waste by the waste module 334, or when the threshold is exceeded, program control passes to a product collection module 344, which decreases the amount of condensate returned to reflux so that the higher temperature acid vapor can reach the condenser 32, and also opens valve 48 to direct product into the product tank 53. Program control then loops back to the decision box 336 and product collection continues until the liquid level in the column reaches the low level sensor 23. At that point, program control returns to the feed module 304, and the batch distillation process begins again with filling of the column 15.

The typical feed concentration for sulfuric acid is 80% by weight, but any other concentration may be easily accommodated, and a single column optimized at 80% may also be programmably operated to handle 60%, 70%, 90%, or other similar concentrations of acid.

Thus, in practicing the method of the present invention with the aforementioned automatic control, the feed is directed through the feed line 14 into the distillation column 15 through the feed inlet 19 with the pump 16 after the valve 17 is opened.

Assuming that the column 15 was empty, the feed will initially flow into the distillation pot 20 and will be communicated out through the purge line 21 in the bottom of the distillation pot 20 with valve 21a closed. As the distillation pot 20 fills, the feed will also fill the sight tube 22. (Valve 12a is preferably automatically controlled to continuously remove a small quantity of acid from the column to waste during operation of the apparatus, preferably with the assistance of a waste pump 21b.) The continuous removal of even 1% of processed acid will prevent the accumulation of particulates in the liquid acid in the column.

The pump 16 will continue to pump feed until the feed level is detected by the high level sensor 24 which indicates that the feed has reached the high level position 26 in the column 15. Once this signal is received, the pump 16 is shut off and the valve 17 is closed. Sometimes, it may be desirable to use the signal when the feed reaches the low level sensor 23 to initiate heating of the distillation pot 20 with the heater 30. This allows the system to come to temperature sooner. Usually, the heater 30 can be turned on after the high level sensor 24 signal is obtained.

Usually, the system has also verified that the cooling system is operational, including ensuring that coolant is flowing through the condenser 32 and the subcooler 43 and that the heat exchanger 81 is functioning. Also, temperatures are monitored in thermocouples 101, 102, and 104.

While the system heats up, the temperature is monitored in the column 15 with thermocouple 100 in well 99 and the temperature of the heater 30 is monitored by thermocouples 30a and 30b. As temperature increases, vapor moves up the column 15 through the packing support 28, the packing 27, the reflux distributor 29, and into the condenser 32. The vapor will condense on the coils 33 and will flow through the stream splitter 37.

The stream splitter is designed so the nipple 38 of the stream splitter 37 will direct the condensate into the reflux line 41 when there is no gas stream in gas line 40, flowing through the nozzle 39. The gas stream is controlled frequently in the process to not only provide the necessary reflux rate for the column, but to also direct the condensate to the product/waste line 42.

The stream splitter can be left in the total reflux condition by simply not sending any gas to the nozzle 39. This condition is seen in the isolation mode or shutdown mode of the system. During the normal first stage and second stage of the operation of the system, the gas flow is modulated to provide the proper reflux and to provide condensate flow to the product/waste line 42.

The decision on the amount of reflux to send to the column is made by measuring the temperature at the boiling pot, here using the thermocouple 100, and by measuring the pressure of the boiling pot, here using pressure sensor 93a. If the pressure and the temperature of the boiling pot are known, then the concentration of the chemical in the pot can be determined to a high degree of accuracy through the use of a calculation made in the control computer. This determination allows the system to know whether to send the condensate (minus what is required for reflux) as communicated in product/waste line 42 through the subcooler 43 and into the junction 47.

At the junction 47, the waste valve can be opened which results in sending the condensate to waste through the structure previously described or the product valve 48 can be opened to communicate the condensate through the product line 51 into the product tank 53. Samples can be controlled and tested in the sample box 52, as required.

In the normal production flow of the system, as the lighter boiling contaminants are distilled first (water in the sulfuric acid case), condensate (minus what is required for reflux) is removed as waste, the measured pressure and temperature of the liquid in the column boiling pot will indicate the increasing chemical product concentration of the liquid in the column. In a preferred embodiment, the system utilizes an algorithm to convert the temperature and pressure measurement to acid concentration. This algorithm can contain an empirically determined look-up table, or can contain mathematical formulas that represent the same data as in a look-up table. When the product concentration in the boiling pot is at the desired weight percent, the system is switched to send most of the condensate to the product storage tank, minus what is needed for reflux. The thermocouple 100 serves as a check on the system, in that it can detect when the lighter boiling water waste (water in the sulfuric acid system) in the first stage contains too much product chemical based on the measured temperature (thermocouple 100 or 100a) increasing beyond the temperature of the contaminant (water) vapor.

Assuming that the product is of acceptable concentration, the product collected in the product tank and continuously circulated through the particulate filter and past the particle counter. If too many particles are present for the chosen end use of the acid, filtration continues until the product has an acceptable particle count for the end use of the material, at which point the product can be pumped out for use or storage.

The distillation is continued in the column 15 until the level of feed being distilled reaches the low level position 25 in the column 15 as detected by the low level sensor 23 in the sight tube 22. At this juncture, first, the stream splitter 37 is deactivated by shutting off the gas flow through line 40 so that any condensate in the system goes to reflux, and the product valve 48 is closed. Thereafter, additional feed can be supplied from the feed reservoir 10 and a new batch run as described above, or the system can be placed into isolation mode, awaiting additional feed acid and/or the need for additional product. The isolation mode is typically only allowed for a finite amount of time, upon which the system goes into a shutdown mode as previously discussed.

EXAMPLES

Additional features, objects, and advantages of the invention will be apparent in connection with the following examples. The examples are, however, illustrative, rather than limiting of the invention.

EXAMPLE 1

Operating Conditions For The Purification Of Sulfuric Acid Contaminant With Nominally 20% By Weight Water Initially, the column is charged with 80% wt sulfuric acid, contaminated with water. The total volume of liquid in the column to the high level sensor is approximately 36 liters, with a variation of about 10 liters between the high and low level sensors.

Heat is applied to the liquid-containing portion of the column until the temperature as measured at the top of the column reaches about 100° C., at which point water begins to condense in the condenser. Sufficient water (e.g., varying around 30% by volume of the total condensate) is reintroduced to the column as reflux to maintain reflux conditions under which little acid (e.g., less than 1% by volume) is being condensed.

In the startup phase, (e.g., for the first two or three batches), the liquid level in the column is likely to reach the low level sensor prior to the liquid acid concentration reaching a predetermined desired level, such as 98%. When this occurs, additional 80% acid feed is introduced, and the distillation begins again. As distillation proceeds, the reflux ratio is increased to prevent distillation of acid. Eventually, as water is removed, the temperature in the column below the packing rises until that temperature (at thermocouple 100) reaches about 330° C. at 760 mm Hg pressure, indicating that the concentration of acid in the reboiler has reached a concentration of about 98%. At this point, the volume of condensate directed into the column as reflux is decreased by about 50%, so that the major portion, about 80% of the condensate is removed from the column. This permits the acid vapor to reach the condenser, and the temperature at the top of the column is permitted to gradually approach the boiling point of the azeotrope at 760 mm Hg. Distillation continues, removing the azeotrope acid until the liquid level in the column reaches the low level sensor. Then, additional 80% acid feed is introduced (bringing the acid concentration in the column down to about 92%), and the batch process is repeated.

EQUIVALENTS

While the invention has been described in terms of certain preferred embodiments and with reference to certain specific Examples and Figures, the invention is not limited thereby, for example, it is possible to run the distillation with various other acids, bases, solvents, or other chemicals containing various contaminants, and to run the distillation at pressures above or below ambient pressure. Accordingly, no matter how detailed the foregoing may appear in text, the scope of the invention should be construed only with reference to the appended claims and any equivalents thereof.

What we claim is:

1. A method for batchwise distillation of a liquid product contaminated with a liquid contaminant, comprising the steps of:

directing said contaminated product into a distillation apparatus, said apparatus having only a single distillation column, wherein said product is a mineral acid;

heating the contaminated product in said distillation apparatus;

monitoring the temperature and optionally the pressure in the distillation column;

first condensing liquid contaminant from vapor exiting the top of the column, and directing increasing amounts of condensate into the column as reflux as the temperature and/or pressure in the column increases, thereby maintaining the composition of the condensate as primarily the liquid contaminant;

then decreasing the amount of condensate returned as reflux when the temperature and/or pressure in the column indicates that the composition of the liquid in the column has reached a desired value, thereby indicating that a desired amount of contaminant has been removed, thus shifting from contaminant removal to product collection; and then collecting condensed product.

2. The method of claim 1, further comprising the step of directing condensed contaminant to waste.

3. The method of claim 1, wherein said contaminant is water.

4. The method of claim 3, wherein said mineral acid is sulfuric acid.

5. The method of claim 3, further comprising the step of circulating said collected product through a filter to remove particulates.

6. The method of claim 3, wherein said steps of directing condensate containing contaminant into the column and decreasing the amount of said condensate returned as reflux are accomplished by applying and releasing a tangential stream of gas to a generally vertical stream of condensate to change the direction of said stream.

* * * * *